(12) United States Patent
Albrecht et al.

(10) Patent No.: US 7,527,071 B2
(45) Date of Patent: May 5, 2009

(54) GAS PLUG CONNECTOR

(75) Inventors: Günter Albrecht, Weddersleben (DE); Detlef Bayer, Wadersloh (DE); Thomas Vogt, Bad Suderode (DE)

(73) Assignee: Mertik Maxitrol GmbH & Co. KG, Thale (DE)

( * ) Notice: Subject to any disclaimer, the term of this patent is extended or adjusted under 35 U.S.C. 154(b) by 275 days.

(21) Appl. No.: 11/597,997

(22) PCT Filed: Jun. 7, 2005

(86) PCT No.: PCT/EP2005/006082

§ 371 (c)(1),
(2), (4) Date: Nov. 30, 2006

(87) PCT Pub. No.: WO2005/121625

PCT Pub. Date: Dec. 22, 2005

(65) Prior Publication Data

US 2008/0078451 A1 Apr. 3, 2008

(30) Foreign Application Priority Data

Jun. 9, 2004 (DE) .................. 10 2004 028 039

(51) Int. Cl.
*F16K 31/06* (2006.01)

(52) U.S. Cl. .............. 137/614.19; 137/614.06; 251/149.9

(58) Field of Classification Search .......... 251/149.9, 251/149.6, 149.1; 137/614.06, 614.19
See application file for complete search history.

(56) References Cited

U.S. PATENT DOCUMENTS

| 4,154,465 | A | * | 5/1979 | Van Meter ............... 285/312 |
| 4,582,295 | A | * | 4/1986 | Kugler et al. ............ 251/149.6 |
| 5,020,563 | A | * | 6/1991 | Hoffman et al. ............ 137/75 |
| 5,379,794 | A | * | 1/1995 | Brown .................. 137/75 |
| 5,983,920 | A | * | 11/1999 | Gapinski et al. ............ 137/231 |
| 6,029,705 | A | * | 2/2000 | Happe .................. 137/630.19 |

* cited by examiner

*Primary Examiner*—John K Fristoe, Jr.
*Assistant Examiner*—Marina Tietjen
(74) *Attorney, Agent, or Firm*—Howard & Howard Attorneys PLLC

(57) ABSTRACT

The aim is to devise a gas plug connector that permits a gas plug to be connected or disconnected only when an additional shut-off valve has been manually closed. To that end the housing (1) of the gas plug connector has a bearing (36) for a switching element (35) that on the one hand is fitted with a guide device (37), on which one end of a plunger (11; 12) installed in the base (2) of the housing (1) is supported, whereas the other end of the plunger (11: 12) is connected to a valve head (15) of a shut-off valve (8) positioned in the gas-carrying chamber (7) of the base (2). On the other hand, the switching element (35) is connected to a locking device, by means of which an insertion of the gas plug (57) dependent on the position of the switching element (35) can be prevented.

8 Claims, 9 Drawing Sheets

GAS PLUG CONNECTOR

TECHNICAL ASPECTS

Figure 1:
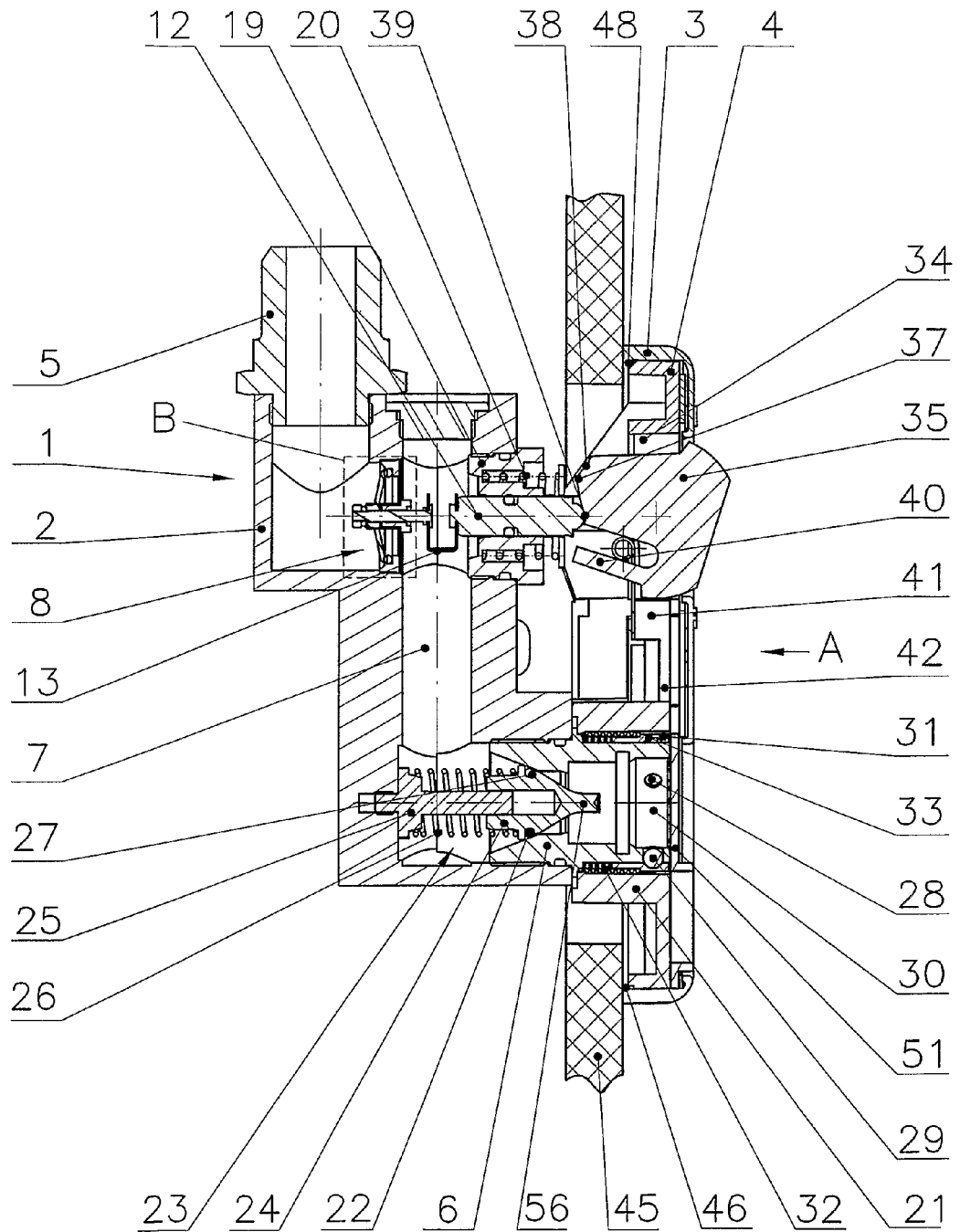

The invention relates to a gas plug connector which provides a secure connection with a fixed gas pipe on the inlet side and a connection for a gas plug, especially a gas tube plug, on the outlet side, with a shut-off device in the housing that only releases the internal flow of gas when the gas plug is connected after external tightness has been established.

CURRENT TECHNOLOGY

Gas plug connectors provide a means of connecting a fixed gas pipe and a gas-operated appliance, such as a domestic cooker, a clothes drier or a grill. They provide a simple means of connecting the gas-operated appliance with the gas pipe.

A gas plug connector of the above type is described in DE 100 61 653 C1. This gas plug connector consists of a base with an integrated inlet socket for making a secure connection with the fixed gas pipe, an outlet socket screwed into the base and a base plate which surrounds the outer surface of the outlet socket at a defined distance to receive the gas plug and is elsewhere screwed to the base. In addition, the base plate can be used for fixing the unit to a wall where a wall fitting is required. Attached to the base is a hood which seals the connection opening of the outlet socket with a cover when the gas plug is disconnected.

For greater safety when using gas plug connectors, especially outdoors, it is desirable that the gas pipe should be capable of being closed manually. In addition, it should be possible to prevent the gas plug from being disconnected or connected if the gas pipe is manually opened. This is not possible with a gas plug connector of the type described above.

Hitherto, the usual way of meeting the above requirements was by fitting into the gas pipe a ball valve of a known type modified for such a purpose, with the normal thread on the outlet of the side ball valve replaced by a socket connection for a gas plug.

This socket connection has retaining balls movable in such a way in radial guide openings on the circumference of the gas outlet that they can change position in a radial direction by means of an axially movable retaining sleeve on the gas outlet. The position of the retaining balls determines whether the gas plug can be connected or disconnected. In addition, because of the design of the operating handle of the ball valve, the retaining sleeve is fixed in such a position when the ball valve is opened that the retaining balls take up a closed position.

In addition, a shut-off valve is housed inside the ball valve that is opened by the gas plug when the latter is connected.

A disadvantage of this version is that the gas outlet opening is not covered and thus provides no protection against the penetration of foreign bodies. In addition, this version is not suitable for a flush installation in walls and its appearance is not such as would be desirable for use in living areas or other areas where it can be seen.

DESCRIPTION OF THE INVENTION

The aim of the invention is to devise a gas plug connector of the type described that enables a gas plug to be connected and disconnected quickly, with connection and disconnection only possible when an additional shut-off valve has been closed manually. Moreover, the gas plug connector should provide protection against the penetration of foreign bodies when the gas plug is not connected. In addition, the gas plug connector should be suitable for flush installations and be of suitable external appearance for use in living areas or other areas where it can be seen. These requirements are met in accordance with the invention as follows: the gas plug connector's housing has a bearing for a switching element that is fitted on the one hand with a guide device on which one end of a plunger installed in the base of the housing is supported, whereas the other end of the plunger is connected in such a way to a valve head of a shut-off valve positioned in the gas-conducting chamber of the base that the shut-off valve can be moved via the switching element into its open or closed position. On the other hand, the switching element is connected to a locking device which prevents the gas plug from being connected if the shut-off valve is in its open position, whereas connection is possible if the shut-off valve is in its closed position.

This has provided a way of eliminating the disadvantages in the current state of technology referred to above. Manual operation of the switching element opens or closes the gas pipe via the shut-off valve with a resulting simultaneous shutting-off or opening of the gas supply. The cover seals the connection opening when the gas plug is not connected, thereby preventing the penetration of foreign bodies.

Additional advantageous designs of the invention are set out in the other patent claims. It is, for example, particularly advantageous if the switching element is installed in the base plate.

In order to simplify assembly and manufacturing as much as possible, it is advantageous if the plunger is in two parts in its longitudinal direction with both pieces interconnected by a spring element.

In addition, a particularly advantageous version is where the shut-off valve closing in the direction of gas flow has an axially movable valve head on the plunger that rests on a hard stop located on the plunger under the force of a spring acting in the direction of opening. With a suitably designed spring it is possible with this arrangement to get the shut-off valve, which is per se manually operated, to close automatically as well if a specified volume flow rate value is exceeded, as can happen for example with a leak downstream in the gas pipe, thereby increasing safety still further.

Simple solutions for preventing disconnection or connection of the gas plug with the locking device connected to the switching element, when the gas pipe has been manually opened, are to form the locking device as a latched slide movable vertically to the axis of the outlet socket or also to form the locking device as a rocker switch whose centre of rotation is between the axis of the plunger and the axis of the outlet socket.

It is advantageous here if a clamping ring is used which is axially movable on the outlet socket and is supported under the force of a spring on the locking device that has two symmetrically positioned limbs, whereby retaining balls positioned in radial guide openings on the circumference of the outlet socket are movable in a known manner in a radial direction by the axial movement of the clamping ring via the inner guide device of the clamping ring, whereby the limbs encircle the clamping ring in a fork-like manner such that a longitudinal movement of the locking device results in an axial movement of the clamping ring.

Using a latched slide as a locking device provides a further advantageous solution, whereby a wire form part is fitted in a circumferential groove of the outlet socket with two symmetrically positioned limbs which are bent in the axial direction of the latched slide and project into a tapering guide cone of the latched slide. Several ring-shaped latch rollers are arranged in a line on the wire form part which, dependent on the distance between the limbs determined by the guide cone and the resulting diameter of the part of the wire form part located in the groove, protrude into the interior of the outlet socket through radial guide openings located in the groove base.

EXECUTION EXAMPLE

Figure 2:
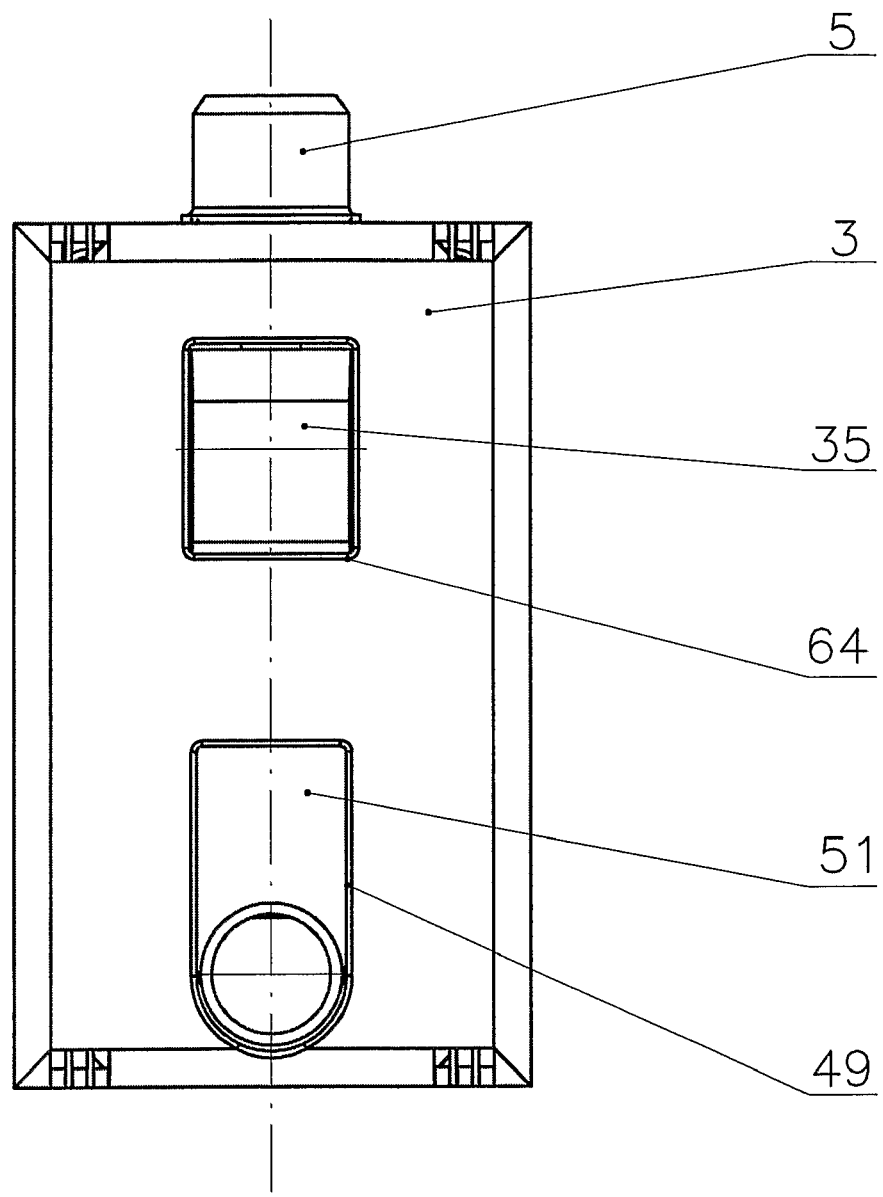
Figure 3:
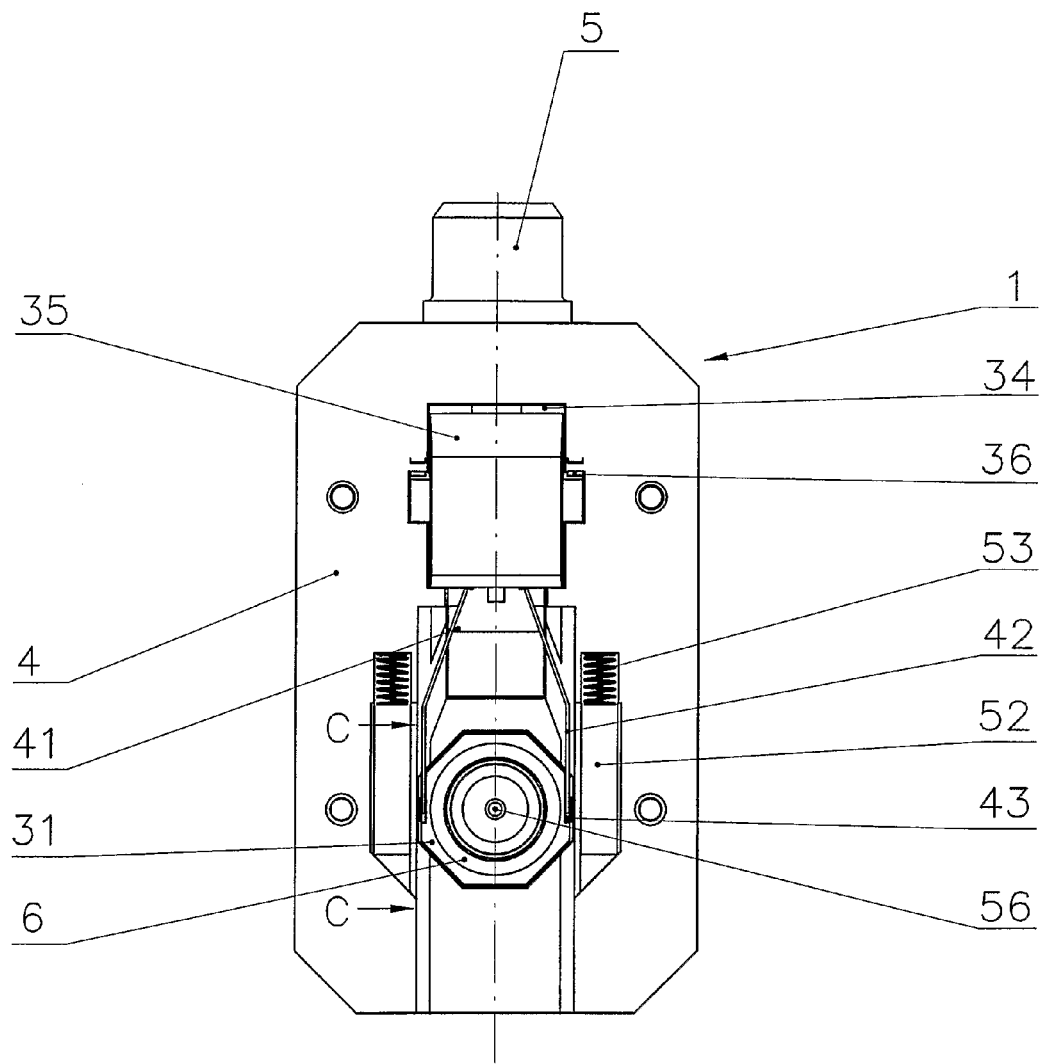
Figure 4:
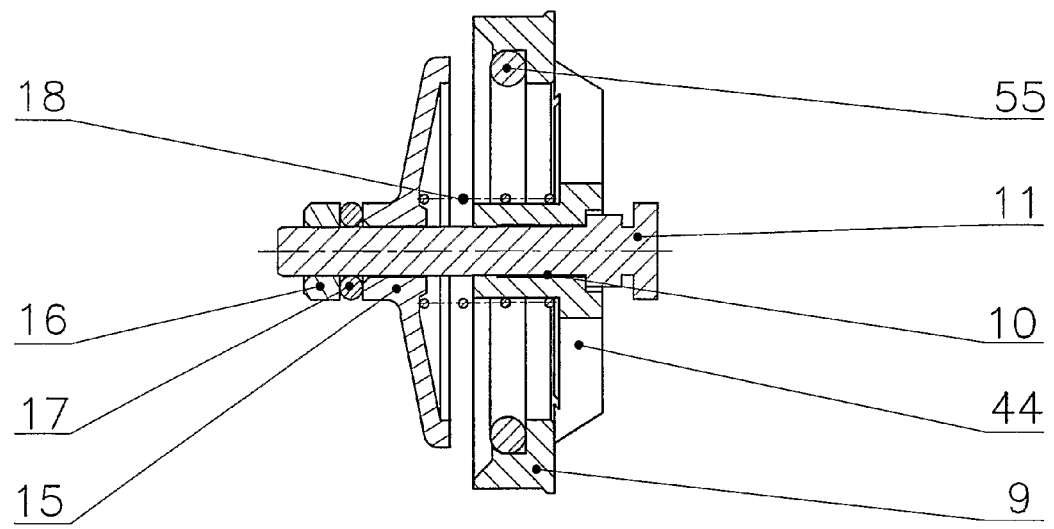
Figure 5:
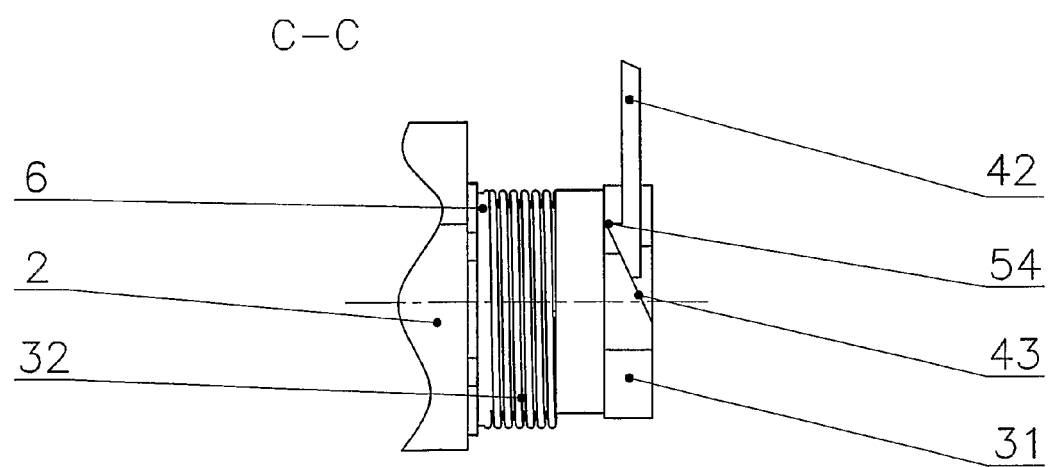
Figure 6:
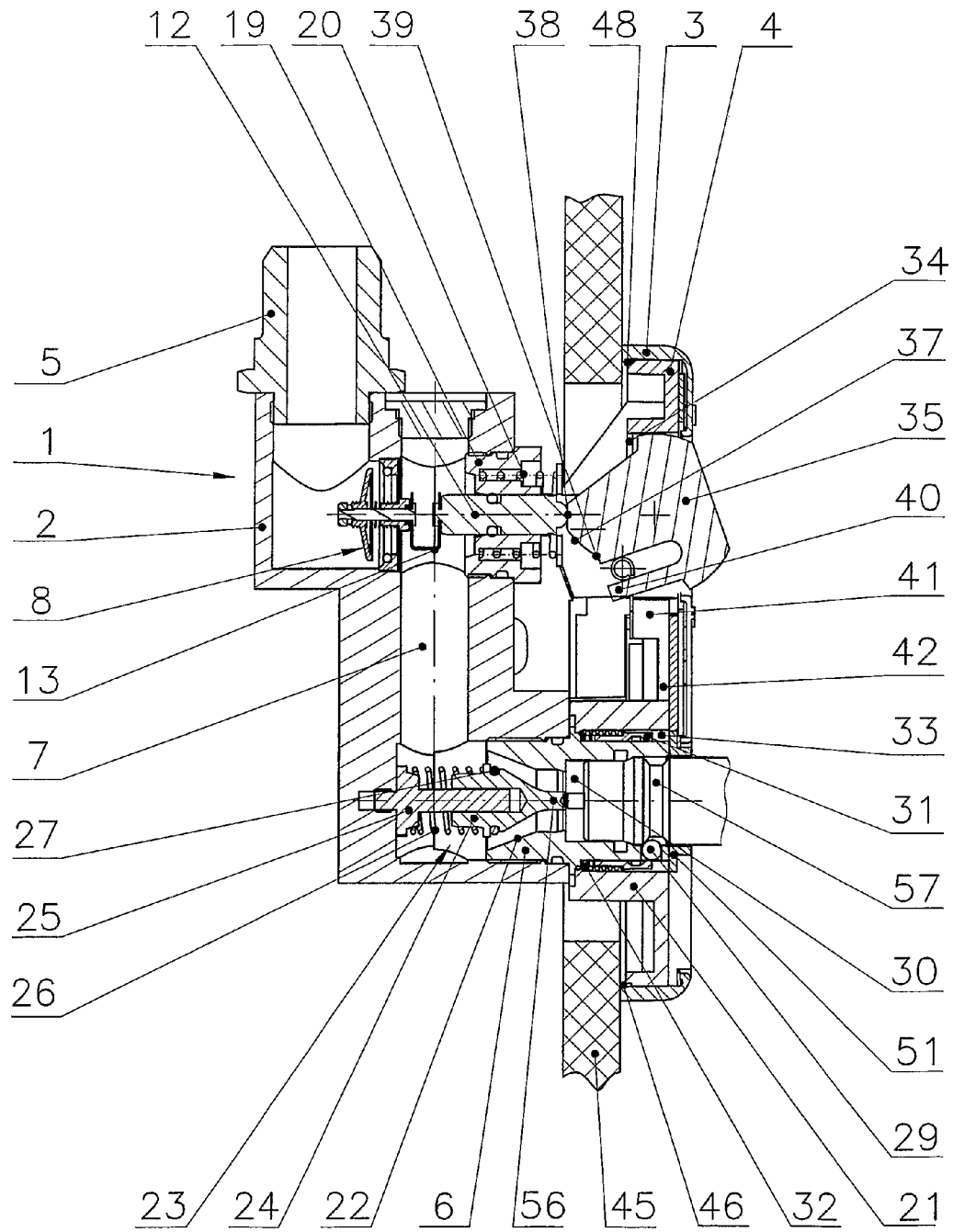
Figure 7:
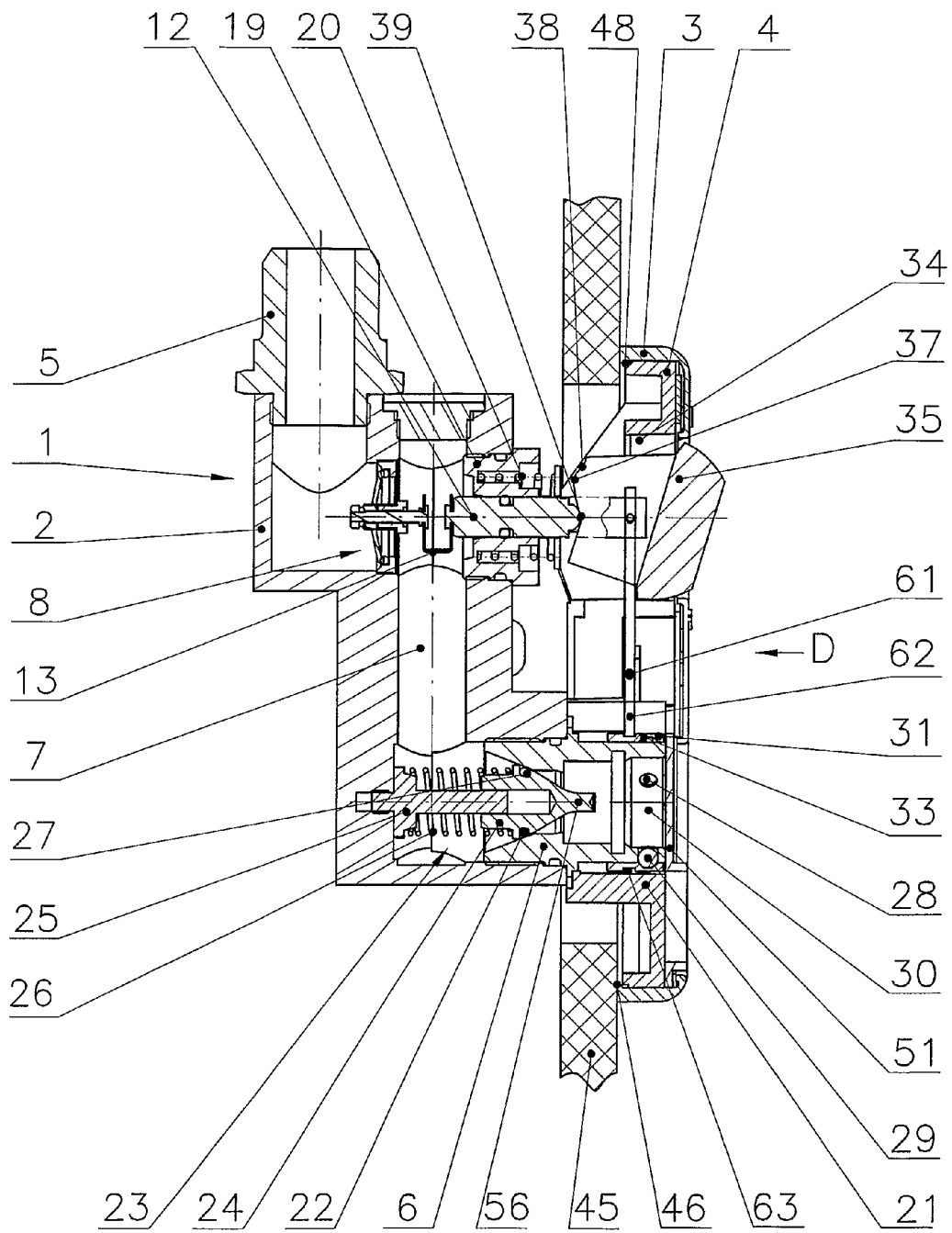
Figure 8:
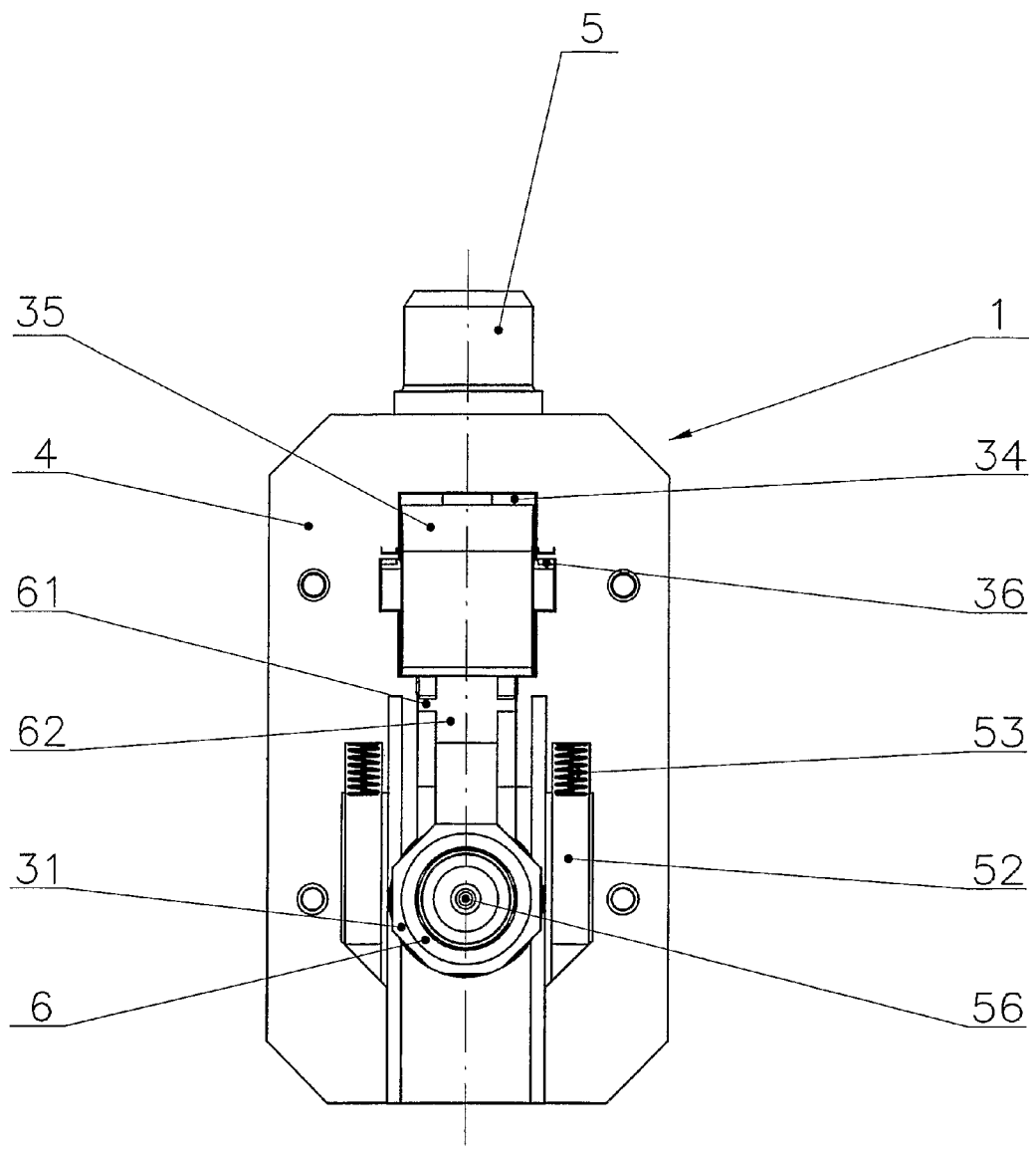
Figure 9:
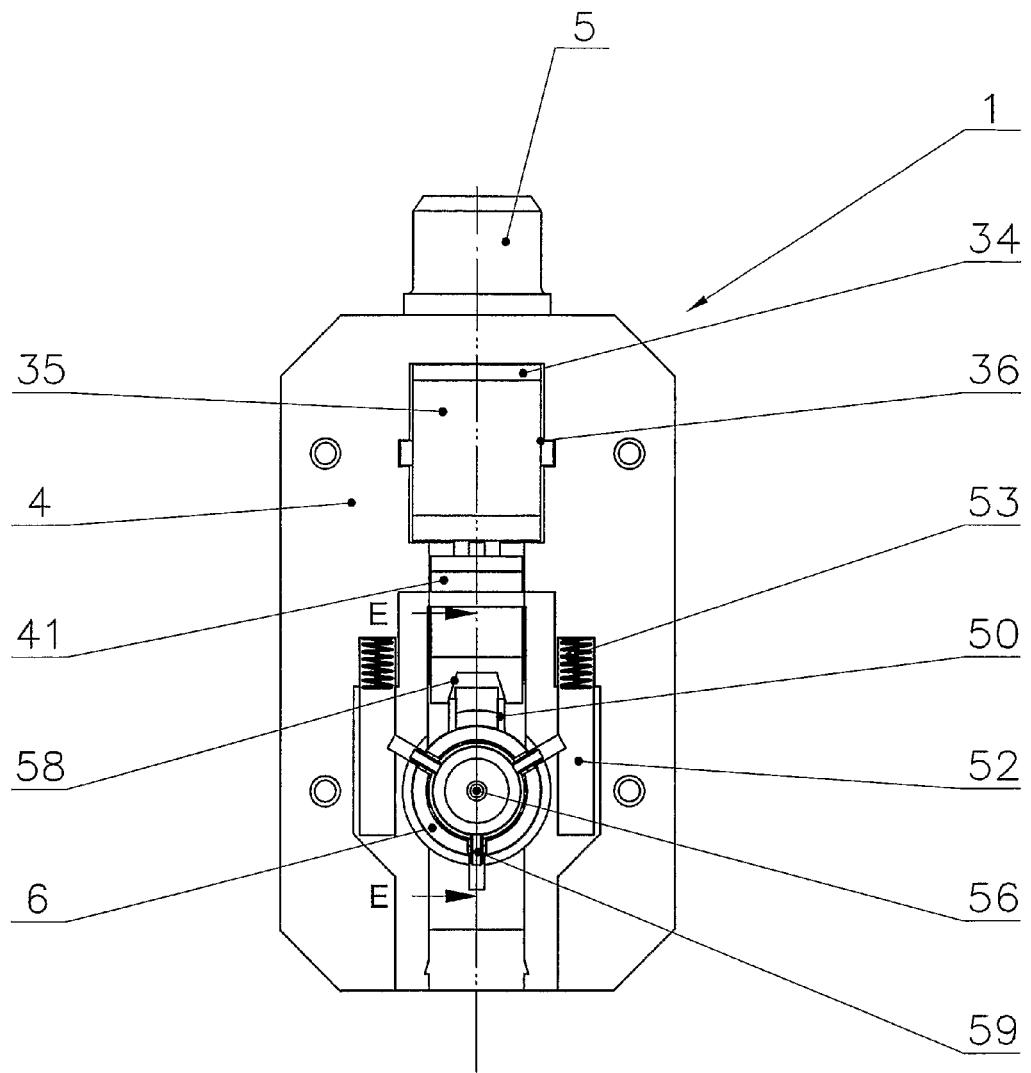
Figure 10:
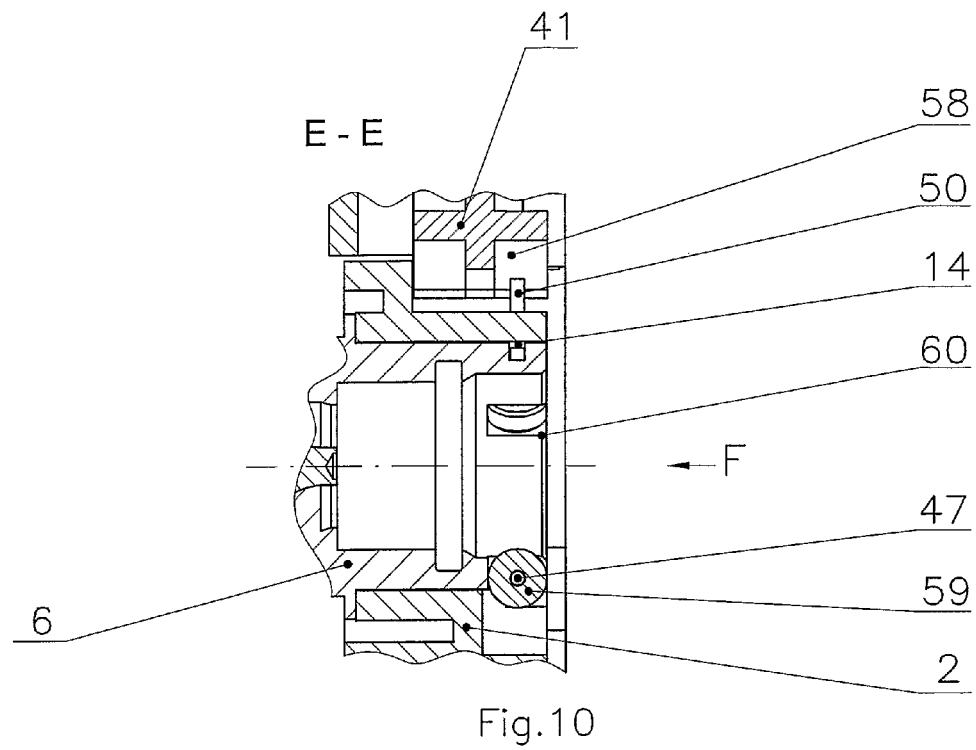
Figure 11:
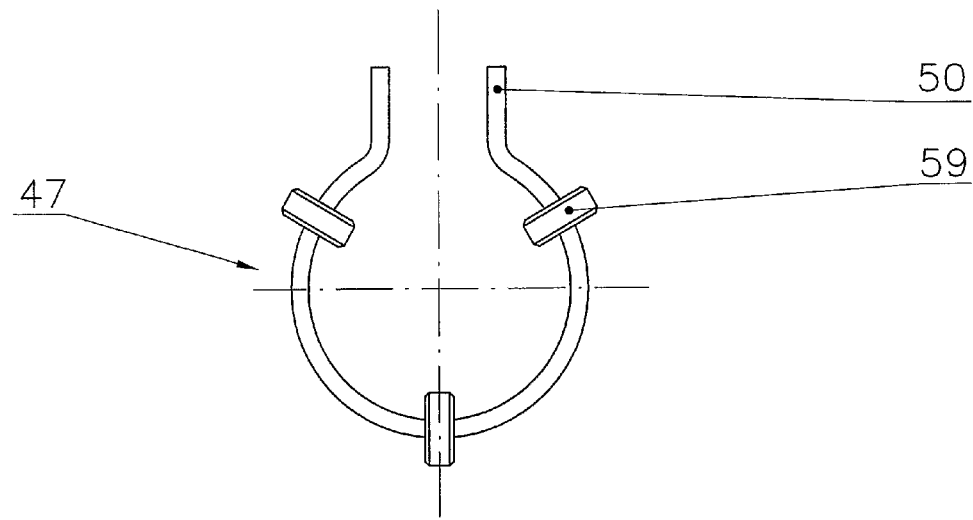

The gas plug connector in accordance with the invention will now be described in greater detail in the following execution examples which show:

FIG. 1 sectional view of a gas plug connector in the closed position,

FIG. 2 a view A of the gas plug connector from FIG. 1,

FIG. 3 a cutaway view of the gas plug connector from FIG. 2,

FIG. 4 a detailed view B from FIG. 1,

FIG. 5 a detailed view C-C from FIG. 1,

FIG. 6 sectional view of a gas plug connector from FIG. 1 in the open position,

FIG. 7 sectional view of a second version of a gas plug connector in the closed position, FIG. 8 a cutaway view D of the gas plug connector from FIG. 7, FIG. 9 a cutaway view of a third version of a gas plug connector, FIG. 10 a sectional view E-E from FIG. 9, FIG. 11 detail of a view F from FIG. 10.

A gas plug connector in accordance with the invention, in a version suitable for flush mounting as shown in sectional view in FIG. 1, has a multi-part housing 1 consisting of a base 2, a hood 3 and a base plate that are firmly interconnected.

An inlet socket 5, which in this case has an external thread to make a firm connection of the gas plug connector with a fixed gas pipe (not illustrated), and an outlet socket 6, which serves to receive a gas plug 57 of matching dimensions, are screwed into the base 2. Here the inlet socket 5 can be in the form of a thermal shut-off device which is known and therefore not explained here in further detail.

Parallel to the axis of the outlet socket 6 the base 2 has a further opening protruding into the gas-conducting chamber 7 through which a shut-off valve 8 closing the chamber 7 can be operated. For this purpose the ring-shaped seat of the shut-off valve 8 has been indented in this case. The shut-off valve 8 described in more detail below used in this execution example has at the same time been designed as a safety shut-off device, which automatically closes the gas-conducting chamber 7 when a specified volume flow rate is exceeded.

The seat 9 of the shut-off valve 8 shown in a sectional view in FIG. 4 in the open position has radial ridges 44 on the outlet side, which are evenly distributed on the circumference and form a centrally positioned bearing 10 for a first part 11 of a two-part plunger 11/12, with both parts securely interconnected by means of a spring element 13. A valve head 15 closing in the direction of flow and movable longitudinally, with an O ring 17 serving as an elastic sealing element positioned between the flange 16 and valve head 15, is fitted on the plunger 11, which has a flange 16 on its inlet end, whose position can preferably be altered for adjusting/setting the closing flow rate described in more detail below. Under the effect of a spring 18 supported on the ridges 44, the valve head 15 is supported in the open position against the O ring 17, whereas the valve head 15 in its closed position rests on an elastic sealing element located in the seat 9 also formed as an O ring 55.

In a bushing 19 closing the opening 14, part 12 of the plunger 11/12 is movable longitudinally on bearings and conducted outwards in a gastight manner. The plunger 11/12 is loaded in the closing direction of the shut-off valve 8 by a spring 20 supported on the bushing 19.

A base plate 4 also forming part of the housing 1 can be used for fixing the unit to the wall to a schematically illustrated curtain wall 45 of the sort frequently used, especially in house building and which are fixed in a known way, for example by screws and dowels, either directly or by means of separate flush sockets, as they are termed. A tubular flange 21 protruding into the curtain wall 45 surrounds the external surface of the outlet socket 6 protruding out of the base 2 at a defined distance explained in more detail below. The base plate 4 is connected to the base 2 by screws for example which have not been illustrated.

The end of the outlet socket 6 protruding into the base 2 forms a valve seat 22 for a shut-off device 23, whose closing body 24 is installed on a guide attachment 25 in the base 2 so as to be movable longitudinally to the axis of the outlet socket 6 and thus also to the valve seat 22. Here the closing body 24 is under the force of a closing spring 26 in the direction of closing supported at one end on the inner wall of the base 2 and at its other end on the closing body 24. An O ring 27 located on the closing body 24 and resting in the closed position on the valve seat 22 serves to guarantee gas tightness. The closing body 24 protrudes into the outlet socket 6 with an axial extension 56.

In the area of the end turned away from the base 2 the outlet socket 6 has several guide openings 28 distributed on its circumference, but radially aligned in one plane. In each of these guide openings 28, a retaining ball 29 is positioned that partly protrudes into the connection opening 30, whereby a reduction in the diameter of the guide opening 28 in the direction of the connection opening 30 prevents the retaining balls 29 from falling through.

On the outlet socket 6 is an axially movable clamping ring 31 which is prevented from turning radially because the clamping ring 31 is securely guided in the flange 21. As may be seen from FIG. 3 an octagonal contour was chosen for this purpose in order, on the one hand, to make the manufacture of the clamping ring 31 as simple as possible and, on the other hand, to take up as little space as possible, with the clamping ring 31 in an axial direction under the effect of a retaining spring 32 supported on the base 2. By means of an inner guide device 33 located in the clamping ring, the retaining balls 29, dependent on the position of the clamping ring 31 on the outlet socket 6, are either retained in their guide openings so that the connection opening 30 is completely opened or they are pushed so far into the guide openings 28 that they partly protrude into the connection opening 30.

The base plate 4 fixed to the curtain wall 45 has a neck 46 that is at least partly circumferential into which catches 48 specially located in the hood, lock into place when a hood is fitted covering the base plate 4.

The hood 3 illustrated in FIG. 2 in the front view of the gas plug connector has on its front side an oblong hole 49, with the connection opening 30 of the outlet socket 6 situated behind a part of the oblong hole 49, and an opening 64 for a switching element 35 explained in more detail below. A cover 51 that is movable longitudinally is positioned between the hood 3 and the base plate 4.

As can be seen from FIG. 3 which shows the gas plug connector from FIG. 2 with the hood 3 and cover 51 removed, there is a guideway 52 for the springs supported in the base plate 4 on both sides of the connection opening 30. The effect of the other end of the springs is to cause the cover 51 (not shown in this view) to close the area of the oblong hole 49 exposing the connection opening 30 of the outlet socket 6 when the gas plug is not connected.

In addition, the switching element 35 previously referred to above protrudes through a recess 34 in the base plate 4 and swivels on corresponding bearings 36 located in the base plate 4, with the swivelling axis of the switching element 35 lying in a plane with the longitudinal axis of the plunger 11/12. On its side facing the base 2 the switching element 35 has a guide device 37 on which the tip of the plunger 12 is supported. The guide device 37 has two lock-in positions 38/39 that have been so fixed that the shut-off valve 8 is either in the open or closed position. In order to make manufacture as simple as possible, the spring element 13 also serves here as a tolerance compensation between the two parts of the plunger 11/12.

On its side facing the outlet socket 6 the switching element 35 has a cone-shaped mounting 40, in which a latched slide 41 serving as a locking device runs on bearings. On its end turned away from the switching element 35 the latched slide 41 has two symmetrically positioned limbs 42 which encircle the clamping ring 31 in a fork-like manner, thereby protruding into a guide device 43 located on the clamping ring 31 so that a longitudinal movement of the latched slide 41 results in an axial movement of the clamping ring 31. This sequence of operations is effected by the simple method of providing each of the two limbs 42 of the latched slide 41, as can be seen from the detailed view in FIG. 5, with a guide lug 54, against which the bevel-shaped guide device 43 is supported in an axial direction under the effect of the retaining spring 32.

The mode of action of the gas plug connector described in this execution example is as follows:

In FIG. 1 the gas plug connector is in the closed position with the outlet socket 6 with its connection opening 30 covered by the cover 51. Because the gas plug 57 has not been inserted, the shut-off device 23 is also closed. Since the switching element 35 is also in the closed position, the plunger 12 rests on the lock-in position 39 and the valve head 15 is pressed against the O ring 55 located at the seat 9 and at the same time against the O ring between it and the flange 21 so that the gas-conducting chamber 7 is closed. By means of the switching element 35 the clamping ring 31 is brought into such a position via the mounting 40 and the latched slide 41 that the retaining balls 29 in resting on the inner guide device 33 open the connection opening 30.

It is possible in this position for the gas plug 57 to be inserted and the shut-off device 23 opened via the extension 56, after the cover 51 has been moved so far against the force of the springs 53 that the connection opening 30 has been opened. After subsequent activation of the switching element 35, the plunger 12 on the guide device 37 is moved to the lock-in position 38. The O ring 17 seated on the plunger 11 opens the valve head 15 and a pressure compensation takes place via a leak flow occurring between the valve head and plunger 11 so that the spring 18 can move the valve head 15 into the open position. The connection with the fixed gas pipe has been made. At the same time, the clamping ring 31 is moved into such a position as described above that the retaining balls 29 protrude into the connection opening 30, thereby locking the gas plug 57 and preventing its removal.

In order to undo the connection again, the switching element 35 must first be activated, thereby closing the shut-off valve 8. Only then is it possible to remove the gas plug 57 after which the shut-off device is closed. After the gas plug 57 has released the cover 51 which is under the force of the springs 53, the cover closes the connection opening 30. The gas plug connector is once again closed as shown in FIG. 1.

If now, for example, a rupture of the gas hose or the like should occur when the gas plug 57 is connected, resulting in a higher closing flow rate due to the force of the spring 18 than that set by the position of the flange 16, the valve head 15 moves against the force of the spring 18 on the plunger 11 and closes the shut-off valve 8 which now functions as a safety closing device.

In a different version of a gas plug connector a clamping ring 31 axially movable on the outlet socket 6 is also used as described above which influences the position of the retaining balls 29 by means of its inner guide device 33.

However, a swivelling rocker switch 62 is located in a bearing 61 in the base plate 4, one end of which is supported in a groove 63 of the clamping ring 31, whereas the other side is extended to the plunger 12 (FIGS. 7 and 8). It goes without saying that the bearing 61 can also be located on the base 2 and/or that the rocker switch 62 can be connected with the switching element 35.

Yet another version of a gas plug connector is shown in FIGS. 9 to 11. In this version, which is in other respects basically the same as those previously described, the outlet socket 6 has a circumferential groove 14 in the area of the end turned away from the base 2 in which a wire form part 47 as shown in FIG. 11 is located with two parallel bent limbs 50 that protrude into a funnel-shaped guide cone 58 of the latched slide 41 that is for its part again installed in the cone-shaped mounting 40 of the switching element 35. Several, in this case three, cylindrical latch rollers 59 are threaded on the circular part of the wire form ring 47. These latch rollers 59 are located in the radial guide openings protruding into the interior of the outlet socket 6, which to facilitate assembly are preferably formed from axially running apertures 60 of the outlet socket 6.

Their mode of operation is similar to that described in the above execution example:

Dependent on the depth of penetration of the limbs 50 into the funnel-shaped guide cone 58, the diameter of the wire form part 47 is altered, as is as a result the radial position of the latch rollers 59 taken up on the longitudinal axis of the outlet socket 6. This makes possible the required locking of the inserted gas plug 57 when the shut-off valve 8 is opened.

The gas plug connector in accordance with the invention is not of course restricted to the execution examples illustrated. On the contrary, alterations, variations and combinations are possible within the parameters of the invention.

For example, the positioning and/or design of the locking device can be altered as can the number of retaining balls 29. Moreover, the gas plug connector can also be designed as a variant known as a surface-mounted fixture.

List Of The Reference Numerals

| List of the reference numerals | |
| --- | --- |
| 1 | Housing |
| 2 | Base |
| 3 | Hood |
| 4 | Base plate |
| 5 | Inlet socket |
| 6 | Outlet socket |
| 7 | Chamber |
| 8 | Shut-off valve |
| 9 | Seat |
| 10 | Bearing |
| 11 | Plunger (Part 1) |
| 12 | Plunger (Part 2)) |

-continued

List of the reference numerals

| | |
|---|---|
| 13 | Spring element |
| 14 | Groove |
| 15 | Valve head |
| 16 | Flange |
| 17 | O ring |
| 18 | Spring |
| 19 | Bushing |
| 20 | Spring |
| 21 | Flange |
| 22 | Valve seat |
| 23 | Shut-off device |
| 24 | Closing body |
| 25 | Guide attachment |
| 26 | Closing spring |
| 27 | O ring |
| 28 | Guide opening |
| 29 | Retaining ball |
| 30 | Connection opening |
| 31 | Clamping ring |
| 32 | Retaining spring |
| 33 | Inner guide device |
| 34 | Recess |
| 35 | Switching element |
| 36 | Bearing |
| 37 | Guide device |
| 38 | Lock-in position |
| 39 | Lock-in position |
| 40 | Mounting |
| 41 | Latched slide |
| 42 | Limb |
| 43 | Guide device |
| 44 | Ridge |
| 45 | Curtain wall |
| 46 | Neck |
| 47 | Wire form part |
| 48 | Catch |
| 49 | Oblong hole |
| 50 | Limb |
| 51 | Cover |
| 52 | Guideway |
| 53 | Spring |
| 54 | Guide lug |
| 55 | O ring |
| 56 | Extension |
| 57 | Gas plug |
| 58 | Guide cone |
| 59 | Latch roller |
| 60 | Aperture |
| 61 | Bearing |
| 62 | Rocker switch |
| 63 | Groove |
| 64 | Opening |

The invention claimed is:

1. A gas plug connector including a housing (1), the housing (1) including a base (2) with an inlet socket (5) to provide a secure connection of the gas plug connector with a fixed gas pipe, an outlet socket (6) for connecting a gas plug (57) and a shut-off device (23) in the base (2), which shut-off device (23) only opens the inner gas path when the gas plug (57) is connected after external tightness has been established, a hood (3) that covers a connection opening (30) of the outlet socket (6) by means of a cover (51) when the gas plug (57) is disconnected, and a base plate (4) that are all interconnected, comprising:

the housing (1) having a bearing (36) for a switching element (35) fitted with a guide device (37), on which one end of a plunger (11; 12), installed in the base (2), is supported, whereas the other end is connected to a valve head (15) of a shut-off valve (8) positioned in a gas-conducting chamber (7) of the base (2) in such a way that the shut-off valve (8) can be brought into its open and closed position via the switching element (35), the switching element (35) being connected to a locking device wherein insertion of the gas plug (57) is prevented when the shut-off valve (8) is in its open position, and wherein insertion of the gas plug (57) is possible when the shut-off valve (8) is in its closed position.

2. The gas plug connector in accordance with claim 1, wherein the switching element (35) is installed in the base plate (4).

3. The gas plug connector in accordance with claim 1 or 2, wherein the plunger (11; 12) is in two parts in its longitudinal direction with both parts connected with each other by a spring element (13).

4. The gas plug connector in accordance with one of claims 1 to 3, wherein the shut-off valve (8) closing in the direction of flow has an axially movable valve head (15) on the plunger (11; 12) which under the force of a spring acting in the direction of opening (18) rests on a flange (16) on the plunger (11; 12).

5. The gas plug connector in accordance with claim 1 or 2, wherein the locking device is a latched slide (41) that is movable vertically to the axis of the outlet socket (6).

6. Gas plug connector in accordance with patent claim 1 or 2, characterised by the fact that the locking device is a rocker switch (62) whose centre of rotation 10 is located between the axis of the plunger (11; 12) and the axis of the outlet socket (6).

7. The gas plug connector in accordance with claim 5, further comprising an axially movable clamping ring (31) on the outlet socket (6) that is supported under the force of a retaining spring (32) on the locking device, whereby retaining balls (29) positioned on the circumference of the outlet socket in radial guide openings (28) are movable in a known way in a radial direction by the axial movement of the clamping ring (31) via the inner guide device (33) of the clamping ring (31), characterised by the fact that the locking device has two symmetrically positioned limbs (42) encircling the clamping ring (31) in a forklike manner such that a longitudinal movement of the locking device results in an axial movement of the clamping ring (31).

8. Gas plug connector in accordance with patent claim 5, characterised by the fact that a wire form part (47) is located in a circumferential groove (63) of the outlet socket (6) with two symmetrically positioned limbs (50) bent in the axial direction of the latched slide (41) which protrude into a tapering guide cone (58) of the latched slide (41) and that several ring-shaped latch rollers (59) are arranged in a line on the wire form part (47), which, dependent on the distance between the limbs (50) determined by the guide cone (58) and the resulting diameter of the wire form part (47) located in the groove (63), protrude through radial guide openings (28) in the base of the groove into the interior of the outlet socket (6).

* * * * *

UNITED STATES PATENT AND TRADEMARK OFFICE
CERTIFICATE OF CORRECTION

PATENT NO. : 7,527,071 B2　　　　　　　　　　　　　　　　　　Page 1 of 1
APPLICATION NO. : 11/597997
DATED : May 5, 2009
INVENTOR(S) : Gunter Albrecht, Detlef Bayer and Thomas Vogt It is certified that error appears in the above-identified patent and that said Letters Patent is hereby corrected as shown below:

In Column 8, line 30, delete "Gas" and replace with --The gas--

In Column 8, line 31, delete "characterised by the fact that" and replace with --wherein--

In Column 8, line 32, delete "centre of rotation 10" and replace with --centre of rotation--

In Column 8, line 48, delete "Gas" and replace with --The gas--

In Column 8, line 49, delete "characterised by the fact that" and replace with --wherein--

Signed and Sealed this

Fourteenth Day of July, 2009

JOHN DOLL
*Acting Director of the United States Patent and Trademark Office*